June 12, 1962  H. J. RUMRILL ET AL  3,038,686
TRACKING DEVICE
Filed Dec. 21, 1956  2 Sheets-Sheet 1
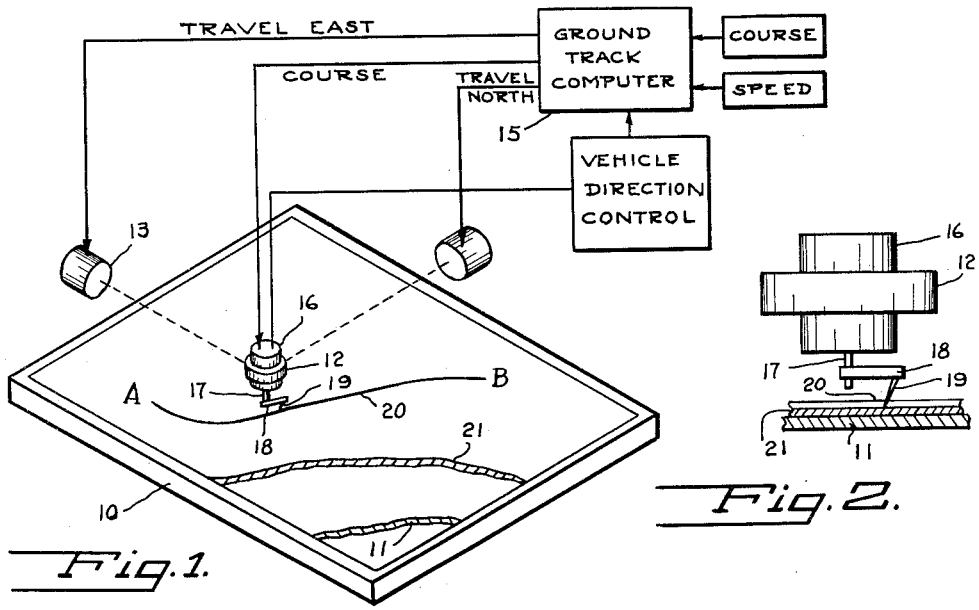
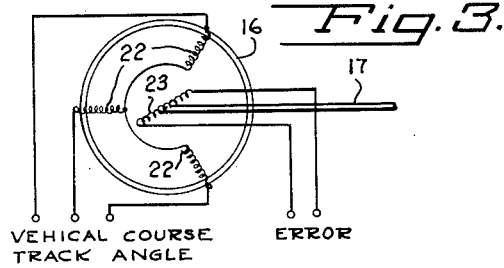
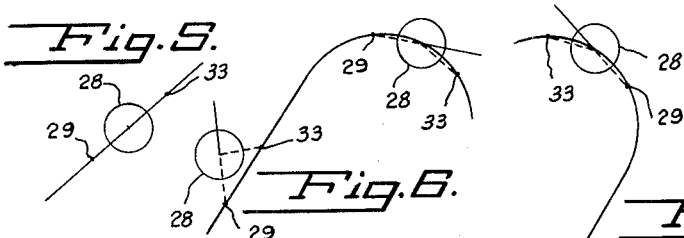
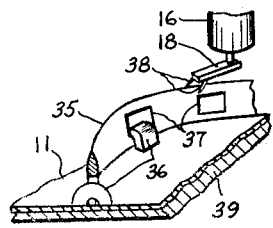
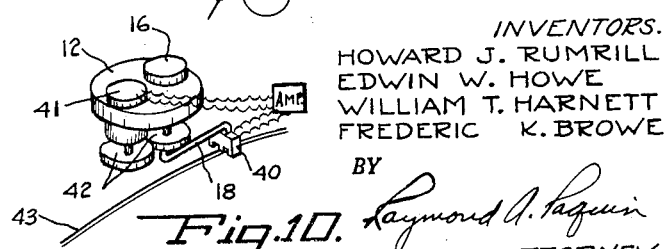
INVENTORS.
HOWARD J. RUMRILL
EDWIN W. HOWE
WILLIAM T. HARNETT
FREDERIC K. BROWE
BY
Raymond A. Paquin
ATTORNEY.

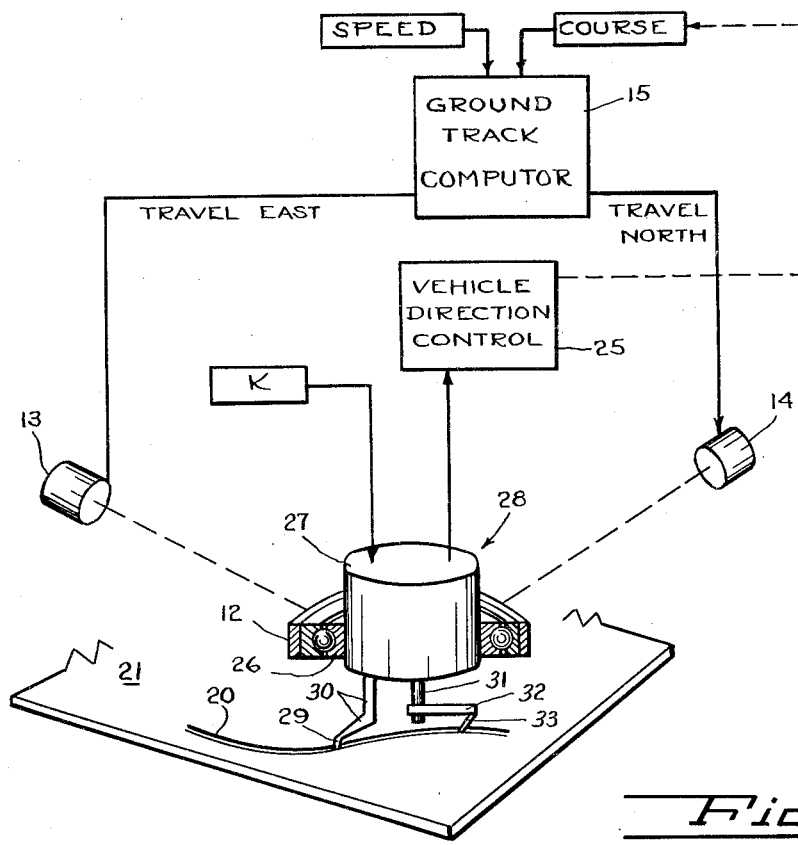

United States Patent Office
3,038,686
Patented June 12, 1962

3,038,686
TRACKING DEVICE
Howard J. Rumrill, Glen Head, Edwin W. Howe, Valley Stream, William T. Harnett, Bayside, and Frederic K. Browe, Wantagh, N.Y., assignors to American Bosch Arma Corporation, a corporation of New York
Filed Dec. 21, 1956, Ser. No. 629,830
8 Claims. (Cl. 244—77)

The present invention relates to positional control devices and has particular reference to curve following apparatus.

Curve followers are well known devices which are used to automatically drive a controlled device along a desired path. A typical known device of this character uses a line drawn on a surface of contrasting color. Photoelectric pickup means, driven over this surface according to the actual present position of the device, determines the displacement of the present position from the desired path and produces a control signal which is effective in returning the controlled device to the path.

In accordance with the instant invention the control signal is produced in a novel manner. The desired path is marked on a suitable surface in the form of a groove, and a stylus attached to the movable member of a transducer which is positioned relative to the groove according to the present position of the controlled device rests in the groove. The displacement between the relatively stationary and movable members of the transducer produces an electric signal which is indicative of the error between the actual and desired paths and which is used to return the controlled device to the desired path.

In a particular embodiment for automatic navigation, a synchro control transformer is positioned over a map representing the area being traversed, and a groove representing the desired path over that area is scratched onto the map surface. The rotor of the control transformer carries a stylus which rides in the groove. The windings of the control transformer are energized by positional signals representative of the actual course of the craft and the rotor is positioned according to the desired course. Any difference between the actual and desired courses produces an output signal which is used to control the heading of the craft so as to return it to the desired path.

In an alternative embodiment, the stator of a potentiometer is rotatably supported in the carriage which is positioned according to present position, and a pair of styli, one attached to the rotor shaft and the other attached to stator casing are adapted to ride in the groove marking the desired path.

For a better understanding of this invention, reference may be had to the accompanying diagrams, in which, FIG. 1 shows the essentials of a proposed embodiment in a pictorial view;

FIG. 2 shows a detail arrangement of one portion of FIG. 1;

FIG. 3 is a schematic diagram of the control transformer of FIG. 2;

FIG. 4 is a modification of FIG. 2;

FIG. 5 shows the orientation of the device of FIG. 4 under certain conditions;

FIG. 6 is a modification of FIG. 5;

FIG. 7 is another modification of FIG. 5;

FIG. 8 is a modification of FIG. 2;

FIG. 9 is a further modification of FIG. 2; and

FIG. 10 is yet another modification of FIG. 2.

Referring now to the figures, and particularly to FIG. 1, there is shown schematically the tracer unit of a dead reckoning navigation apparatus of standard type, modified as will be described for the purposes of this invention. The tracer unit includes a table 10 on which is placed a map 11 of the area to be traversed by the vehicle carrying the apparatus. A tracer carriage 12 is driven by motors 13 and 14 over the map 11 in accordance with the easterly and northerly travel of the vehicle in response to electrical signals developed in the ground track computer 15. The tracer unit thus far described is well known in the art and will not be further described here.

The unit is modified by substituting a synchro control transformer 16 for the pencil which is usually driven by the tracer carriage 12. The control transformer rotor shaft 17 (FIG. 2) protrudes on the end near the map 11 and carries on it an arm 18 and a stylus 19 rigidly secured to arm 18. The stylus 19 rides in a groove 20 which is drawn on the surface of the map 11, or on the surface of an overlay 21, if the surface of the map is such that a groove cannot be made thereon. For this purpose, the overlay 21 is preferably a transparent plastic sheet material which is easily scored by a sharp or hot instrument. The groove 20 is made on the overlay 21 to correspond with the predetermined path which it is desired to have the vehicle follow.

The control transformer 16 has a stator winding 22 (FIG. 3) which is energized by the alternating voltage representing the course angle output of the computer 15, producing in the control transformer 16 an alternating magnetic field in a direction, relative to the frame, which corresponds to the course in which the vehicle is proceeding.

The rotor winding 23 is displaced relative to the frame of the control transformer 16 according to the angle of bearing between the present vehicle position as represented by the position of carriage 12, and the future vehicle positioned as represented by the stylus 19.

When the axis of the rotor winding 23 is perpendicularly disposed to the axis of the magnetic field produced by the stator windings 22, the rotor is in the position known as the null position and no voltage appears at the terminals of the rotor winding 23.

The rotor winding 23 is displaced from this null position by the action of the stylus 19 whenever the actual course of the vehicle is not the same as the desired course and the position of the carriage 12 is not directly over the groove 20 so that a voltage proportional in magnitude to the amount of error between the actual course and the course required to keep the vehicle on the desired path and corresponding in sign to this error, appears at the terminals of the rotor winding 23.

The error output voltage of rotor winding 23 is applied to a vehicle direction control 25 which regulates the direction of motion of the vehicle according to the error voltage and alters the direction of motion so as to decrease the error voltage. The vehicle direction control 25 may be one of the usual types of auto-pilots or auto-navigator controls, for example.

The error voltage is therefore effective in causing the vehicle to approach the desired path if it had been displaced therefrom, or to execute a turn such as demanded to keep the vehicle on the desired path.

The system is put into operation by initially positioning the carriage 12 at a starting point A on the path 20, leaving motors 13 and 14 deenergized. The vehicle is then directed to approach the point B along a course substantially the same as that which is required to keep a vehicle at A moving along the desired path 20. At the instant the vehicle passes over the point A, the system is energized. Any difference between the desired and actual track will cause the auto-pilot to change the vehicle heading so as to reduce this difference. Any difference between the starting point A and the vehicle position at the instant the instrument is energized will not be corrected but will remain as a constant error in position.

For example, assume that the vehicle is moving on a course equal to the desired course at point A, but is displaced from point A, by a distance $d$ in any direction, when the automatic curve follower is switched on. There will be no output from the control transformer pickoff since the actual course is equal to the desired course and there will, therefore, be no change in the course or position of the vehicle. The carriage 12 will be driven by the motors 13 and 14 according to the actual motion of the vehicle, north and east, from the time the instrument was switched on so that the difference between the actual vehicle position and the indicated vehicle position will remain equal and parallel to the distance $d$.

FIG. 4 shows an alternative arrangement in which a constantly energized potentiometer 28 is used to replace the synchro control transformer 16. In this embodiment, the stator casing 27 of a potentiometer 28 is mounted in the carriage 12 in bearings 26 which allow the casing 27 to rotate with respect to the carriage 12. The ground track computer 15 receives inputs of vehicle speed and course and provides outputs proportional to the east and north travel of the vehicle. These outputs energize the motors 13 and 14 to drive the carriage 12 proportionally to the actual easterly and northerly travel respectively over the facsimile or map 21. A stylus 29 is attached to the casing 27 through the stylus arm 30. The rotor shaft 31 of the potentiometer 28, which drives the movable member thereof, also carries an arm 32 and a stylus 33. The styli 29 and 33 ride in the groove 20 on map 21 with the stylus arm 32 being oriented in the direction of travel, and stylus arm 30 being oriented in the direction from which the vehicle has come. The axis of rotor shaft 31 corresponds to the present position of the vehicle.

The input winding of potentiometer 28 is energized by a constant amplitude voltage, available from source K, while the output is connected to the vehicle direction control 25.

When the stylus 29, shaft 31 and stylus 33 are aligned, as in FIG. 5, there is not output from potentiometer 28 and the vehicle continues to travel on its present course. If the center of shaft 31 is displaced to the left of the line running from stylus 29 to 33 as in FIG. 6 the signal produced in the potentiometer 28 and applied to the vehicle direction control 25 will cause the vehicle to execute a right hand turn. When the center of shaft 31 is displaced to the right of the straight line running from stylus 29 to stylus 33, as in FIG. 7, the vehicle will make a left hand turn. The rate of the turn executed by the vehicle is dependent upon the relative displacement between the stator and rotor of the potentiometer 28, and is therefore dependent upon the displacement of the shaft 31 from the straight line joining 29 and 33.

It will be seen that the present apparatus will cause the vehicle to return to the desired path if its position deviates therefrom, and when a curved path is required the vehicle will turn until the rate of turn is great enough to keep the rotor shaft 31 over the groove 20.

It is contemplated that the line 20 may take many forms other than the groove specified earlier. For example, the line 20 may be drawn with magnetic ink (FIG. 8) producing a line which will attract a magnet 34 inserted in arm 18 of the pickoff shaft 17 in place of the stylus 19. In yet another alternative, a raised line may be used. FIG. 9 shows in a partial sections, a stiff tape 35 such as a metallic tape for example, set on its edge along the path to be followed. The tape is held in place by a series of weights 36 which fit into as many perforations 37 in the tape 35 as required to keep it in place. For additional holding power, the weights 36 may be magnets and the table 39 of the tracking unit 10, below the map 11, made of magnetic material. The arm 18 is terminated in a pair of wires 38 which straddle the top of the tape 35 and actuate the rotor of the pickoff device 16. The tape track 35 will allow easy alteration of the desired path, even after the curve following operation has started. Also, the elements of the tape structure can be used again and again while the overlay with the scratched groove must be replaced from time to time.

Although the present invention has been described in connection with a navigational control apparatus it is not intended to be limited thereto but may be applied to any curve following apparatus within the scope of the appended claims.

A further modification is shown in FIG. 10 where the arm 18 is servo controlled according to a pickoff which cooperates with a magnetic line representing the desired track. The piskoff 40 may be an E type pickoff of well known design having an energized center leg and two outer legs carrying serially connected pickoff solenoids. When the center leg is positioned directly over the magnetic line 20, the voltages induced in the pickoff solenoids are equal and opposite making the net output of the pickoff 40 equal to zero. If the pickoff 40 is displaced to either side of the position directly over the magnetic line 43, the voltage output corresponds to this deviation in magnitude and direction. The output of the pickoff 40 is used to energize the servo motor 41 (through an amplifier, if necessary) to drive the arm 18 through gearing 42 until the output of the pickoff 40 is zero. The stators of motor 41 and synchro generator 16 are, of course, carried by the carriage 12, as in FIG. 1. This type of control finds utility if the torque required to drive the rotor shaft 17 is considerable, and might result in undue wear of the track or stylus, for example.

We claim:

1. In a device of the character described, a tracking device for a vehicle adapted to traverse a given area comprising, a facsimile of said area, a line of characteristic property on said facsimile corresponding to the desired path of said vehicle over said given area, to rotary pickoff means having a stator and a rotor and a shaft connected to said rotor, means for positioning said rotary pickoff means on said facsimile according to the actual position of said vehicle on said given area, an arm mounted on the shaft of said rotary pickoff means, means on said arm cooperating with said line, means for controlling the path of said vehicle, said controlling means being responsive to the output of said pickoff means.

2. In a device of the character described, a tracking device for a vehicle adapted to traverse a given area comprising, a facsimile of said area, a line of characteristic property on said facsimile corresponding to the desired path of said vehicle over said area, a carriage positioned over said facsimile according to the actual position of said vehicle on said given area, rotary pickoff means including outer and inner members rotatable relatively to each other carried on said carriage, an arm appended to said carriage cooperating with said line and adapted to displace the inner member of said rotary pickoff device, means for controlling the path of said vehicle, said controlling means being responsive to the output of said rotary pickoff means, and effective to modify the motion of said vehicle according to the rotary pickoff means output.

3. In a device of the character described, a tracking device for a vehicle adapted to traverse a given area comprising, a facsimile of said area, a line of characteristic property on said facsimile corresponding to the desired path of said vehicle over said area, a carriage positioned over said facsimile according to the actual position of said vehicle on said given area, rotary pickoff means including outer and inner members rotatable relatively to each other carried on said carriage, an arm appended to said carriage cooperating with said line and adapted to displace the inner member of said rotary pickoff device, a second arm appended to said carriage and cooperating with said line and adapted to displace the stator of said pickoff device, means for controlling the path of said vehicle, said controlling means being responsive to the output of said rotary pickoff means, and effective to modify the motion of said vehicle according to the rotary pickoff means output.

4. In a device of the character described, a tracking device for a vehicle adapted to traverse a given area comprising, a facsimile of said area, a groove on said facsimile corresponding to the desired path of said vehicle over said area, a carriage positioned over said facsimile according to the actual position of said vehicle on said given area, rotary pickoff means including outer and inner members rotatable relatively to each other carried on said carriage, an arm appended to said carriage having a stylus cooperating with said groove and adapted to displace the inner member of said rotary pickoff device, means for controlling the path of said vehicle, said controlling means being responsive to the output of said rotary pickoff means, and effective to modify the motion of said vehicle according to the rotary pickoff means output.

5. In a device of the character described, a tracking device for a vehicle adapted to traverse a given area comprising, a facsimile of said area, a magnetic line on said facsimile corresponding to the desired path of said vehicle over said area, a carriage positioned over said facsimile according to the actual position of said vehicle on said given area, rotary pickoff means including outer and inner members rotatable relatively to each other carried on said carriage, an arm appended to said carriage having a magnetic means cooperating with said magnetic line and adapted to displace the inner member of said rotary pickoff device, means for controlling the path of said vehicle, said controlling means being responsive to the output of said rotary pickoff means, and effective to modify the motion of said vehicle according to the rotary pickoff means output.

6. In a device of the character described, a tracking device for a vehicle adapted to traverse a given area comprising, a facsimile of said area, a groove on said facsimile corresponding to the desired path of said vehicle over said area, a carriage positioned over said facsimile according to the actual position of said vehicle on said given area, rotary pickoff means including outer and inner members rotatable relatively to each other carried on said carriage, an arm appended to said carriage having a stylus cooperating with said groove and adapted to displace the inner member of said rotary pickoff device, a second arm appended to said carriage and cooperating with said line and adapted to displace the outer of said pickoff device, means for controlling the path of said vehicle, said controlling means being responsive to the output of said rotary pickoff means, and effective to modify the motion of said vehicle according to the rotary pickoff means output.

7. In a device of the character described, a tracking device for a vehicle adapted to traverse a given area comprising, a facsimile of said area, a line of magnetic property on said facsimile corresponding to the desired path of said vehicle over said area, a carriage positioned over said facsimile according to the actual position of said vehicle on said given area, rotary pickoff means including outer and inner members rotatable relatively to each other carried on said carriage, an arm appended to said carriage a second pickoff means carried by said arm, a motor carried by said carriage and energized by said second pickoff means, said motor being adapted to drive said arm so that the second pickoff means is centered over said magnetic line and adapted to displace the inner member of said rotary pickoff device, means for controlling the path of said vehicle, said controlling means being responsive to the output of said rotary pickoff means, and effective to modify the motion of said vehicle according to the rotary pickoff means output.

8. In a device of the character described, a controlled unit driven over a given area, a facsimile of said area, a line of characteristic property on said facsimile corresponding to the desired path of the controlled unit over said given area, rotary pickoff means positioned on said facsimile according to the actual position of said unit on said given area, said pickoff means having a stator and a rotor and a shaft connected to said rotor, an arm mounted on the shaft of said pickoff means, means on said arm cooperating with said line, means for controlling the path of said controlled unit, said controlling means being responsive to the output of said pickoff means.

References Cited in the file of this patent

UNITED STATES PATENTS

| | | |
|---|---|---|
| 2,354,391 | McCourt | July 25, 1944 |
| 2,679,620 | Berry | May 25, 1954 |
| 2,679,622 | Deri | May 25, 1954 |